United States Patent [19]

Yoshikawa et al.

[11] 4,202,029
[45] May 6, 1980

[54] TRANSPORTABLE TELEPHONE EXCHANGE APPARATUS

[75] Inventors: Hiroshi Yoshikawa, Fujisawa; Akihiro Kawakami; Hideaki Sato, both of Yokohama, all of Japan

[73] Assignee: Hitachi, Ltd., Japan

[21] Appl. No.: 715,721

[22] Filed: Aug. 19, 1976

Related U.S. Application Data

[63] Continuation of Ser. No. 503,876, Sep. 6, 1974, abandoned, which is a continuation of Ser. No. 364,495, May 29, 1973, abandoned.

[51] Int. Cl.² ............................................. H02B 1/04
[52] U.S. Cl. ..................................... 361/394; 179/149; 179/168; 361/331; 361/426
[58] Field of Search .................. 49/396; 178/78; 179/149, 168; 312/120, 294, 298, 299, 324, 326; 211/169; 361/331, 332, 334, 380, 390, 391, 426, 428, 394, 393

[56] References Cited

U.S. PATENT DOCUMENTS

| | | | |
|---|---|---|---|
| 2,928,555 | 3/1960 | Childs | 211/169 |
| 3,745,399 | 7/1973 | Usizima | 317/99 |
| 3,755,716 | 8/1973 | Yoshii | 317/99 |

FOREIGN PATENT DOCUMENTS 1371826  8/1964  France ..................... 317/101 CB Primary Examiner—Gerald P. Tolin
Attorney, Agent, or Firm—Craig and Antonelli

[57] ABSTRACT

In communication equipment such as a telephone exchange machine, a compact and easily accessible arrangement of a plurality of gate-type or rotatable frames.

7 Claims, 8 Drawing Figures

TRANSPORTABLE TELEPHONE EXCHANGE APPARATUS

This is a continuation, of application Ser. No. 503,876 filed Sept. 6, 1974 which is a continuation of Ser. No. 364,495 filed May 29, 1973, now abandoned.

This invention relates generally to communication equipment or more in particular to communication equipment with rotatable gates suitably used for telephone exchange machines.

In the conventional communication equipment, a terminal strip wired with cables is provided in each of plurality of frames or racks of the communication equipment. The tendency in recent years is toward the demand for closely-packed communication equipment or especially communication equipment with a mobile or relocatable container closely filled with a multiplicity of communication apparatuses. As a measure to save the floor space occupied by the communication apparatuses, communication equipment having double or triple gates are in commercial use. Further, action has been taken to pack the container even more closely with a multiplicity of groups of the triple gates. This highly-packed arrangement, however, requires a great number of bunches of wiring between the communication apparatuses or gates or with external equipment, resulting in an undesirably great number of steps of assembly work as well as long time required therefor.

Accordingly, it is an object of the present invention to provide an arrangement of a multiplicity of frames for as many communication apparatuses as possible in a predetermined size of container without any adverse effect on the maintenance work thereof.

Another object of the invention is to facilitate the maintenance and wiring jobs on communication apparatuses closely packed in the communication equipment, or more in particular to provide communication equipment in which cables from external apparatuses are introduced not directly to the gates of the communication equipment but through terminal frames at the supporting points of the rotatable gates in order to facilitate the cable maintenance and wiring jobs.

The present invention will be described in detail with reference to the accompanying drawings, in which.

Figure 1:
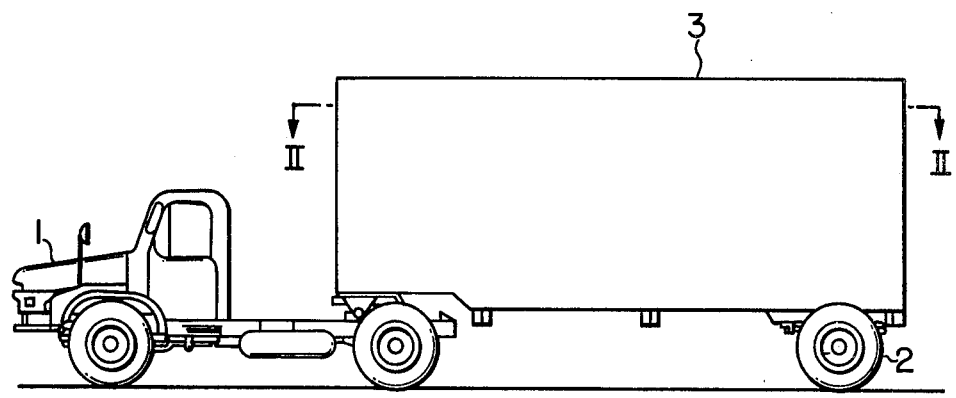
FIG. 1 is a side elevational view showing one form of transportable telephone exchange container.

Referring to FIG. 1, a transportable telephone exchange apparatus according to the invention is generally designated by reference numeral 3 and is shown as being transported on the road to a desired location of installation. In the illustrated example, the transportable telephone exchange apparatus 3 is connected at its front part with a tractor 1 and is provided at its rear part with a dolly 2. After transportation to the desired location of installation, the transportable telephone exchange apparatus 3 is slightly lifted by a suitable lifting means and the tractor 1 and the dolly 2 are disconnected from the apparatus 3. Then, the upward pressure applied by the lifting means is released to lower and place the apparatus 3 on a pre-formed concrete foundation.

Figure 2:
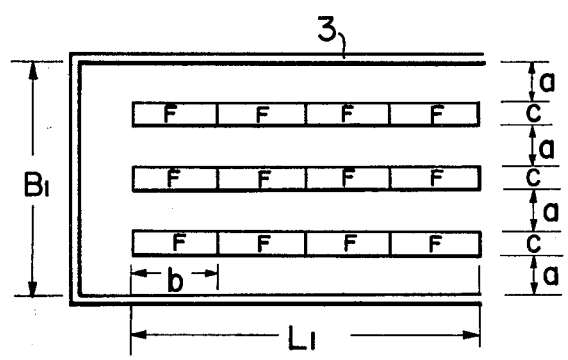
FIG. 2 is a cross-sectional view taken substantially along line II—II in FIG. 1, showing a conventional arrangement of frames within the container.

In one of the conventional transportable telephone exchange apparatuses, frames are arranged in series in a plurality of parallel lines in the longitudinal direction within the container as shown in FIG. 2. In immediately front and on the back of each frame F, space a is required to be provided to allow the worker to perform jobs of assembly, maintenance and inspection.

This gives rise to the disadvantage that very great floor space is occupied by the communication apparatuses within the container.

Figure 3:
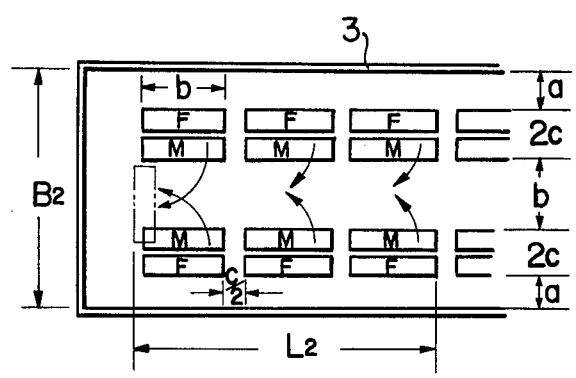
FIG. 3 is a cross-sectional view taken substantially along line 11—II in FIG. 1, showing another conventional arrangement of frames.

Referring to FIG. 3 showing another conventional arrangement of the frames, a couple of two different frames are disposed back to back in such a manner that one of them F is fixed on the floor of the container while the other M is rotatable about an end thereof. A plurality of such couples of frames are arranged in series on both inner sides of the container so that the rotatable ones of the frames are placed face to face in spaced relationship with each other, the space b therebetween accommodating the rotation of only one of the opposed pair of frames at a time. The required space b, however, is greater than the area covered by the rotational radius of the rotatable frame M, with the result that the space needed in this arrangement is only about 10% less than that required in the arrangement of FIG. 2.

This invention is intended to obviate the abovementioned disadvantages of the conventional arrangements and to provide a novel arrangement capable of containing a greater number of frames for communication equipment. The invention will be now explained in detail with reference to the accompanying drawings.

Figure 4:
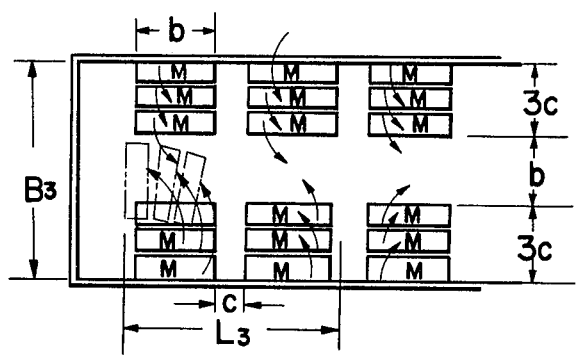
FIG. 4 is a cross-sectional view taken along line II—II in FIG. 1 for showing a multiplicity of frames arranged in the container by the present invention.

As shown in FIG. 4, a plurality of frame groups each including at least three rotatable frames with a common supporting point are arranged immediately adjacent to the inner side walls of the mobile or fixed container in such a manner as to achieve symmetric formation with respect to the longitudinal center line of the container, while at the same time providing the central space b for allowing the rotation of either of the opposed frame groups by approximately 90 degree at a time. In this way, the inner space of the container is saved by about 50% as compared with the method shown in FIG. 2.

The spaces required in the methods of arrangements shown above will be compared below with reference to the symbols used in the drawings.

As an example, the above-mentioned three methods of arrangement each involving 12 frames will be compared with each other with the method of FIG. 2 as a standard.

The space required to accommodate 12 frames of communication equipment by the method of FIG. 2 is $B_1 \times L_1$ which is equivalent to $$(4a + 3c)(4b) \tag{1}$$

while the space required to contain the same number of frames in the case of FIG. 3 is $B_2 \times L_2$ which is equal to $$(2a+b+4c)(3b+1.5c) \qquad (2)$$

Further, the arrangement of FIG. 4 requires the space of $B_3 \times L_3$ which is tantamount to $$(b+6c)(2b+2c) \qquad (3)$$

To facilitate comparison, the numerals 2, 3 and 1 are substituted into a, b and c respectively whereby the figures 132, 115.5 and 72 are obtained for the respective arrangements. The required spaces for the three methods of arrangement are thus in the approximate ratio of 1 to 0.9 to 0.5. From this, it is apparent that the method of arrangement according to the invention requires the space only about half and two thirds of those arrangements shown in FIGS. 2 and 3 respectively.

It will be understood from the above explaination that according to the present invention a plurality of frame groups each comprising a plurality of rotatable frames having a common supporting point are disposed within the mobile container in such a manner that rotatable frames constituting a pair of the groups are opposedly arranged in the container with a sufficient space provided therebetween to allow the rotation of one of the groups making up the pair at a time. The method of arrangement according to the invention thus requires much smaller space than the conventional methods and also permits more compact construction of the container, thereby facilitating the relocation of the whole equipment.

Explanation will be made now of the relationship between the arrangement of the rotatable frames provided in the container and the terminal frame for facilitating the maintenance and wiring jobs.

Figure 5:
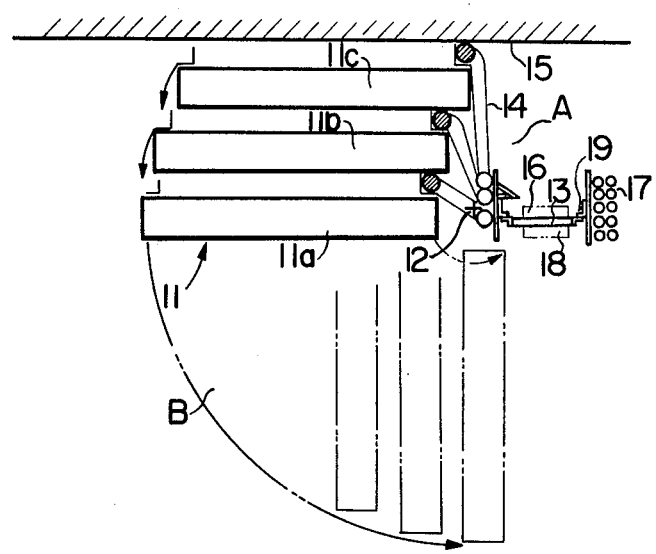
FIG. 5 is a plan showing the relationship between the triple gates and the terminal frames according to the invention.

Referring to FIG. 5, reference numeral 11 generally shows a gate group comprising a plurality of gates 11a to 11c which are appropriately displaced or offset with respect to one another along its displacement path of movement between the normal position as shown in solid line and a position within the maintenance path as shown by the two point chains so that one of the ends of each gate follows a common locus. Numeral 12 shows a supporting point for connecting the gate units 11a to 11c independently by means of a hinge not shown in the drawing. Numeral 13 shows a terminal strip arranged in the vicinity of the supporting point 12 substantially at right angles to the short sides of the gate 11, numeral 14 bundles of wires connected to the gates 11a to 11c from external equipment, numeral 15 the inner wall of the trailer-type container, numeral 16 the back side of the terminal strip 13, numeral 17 a cable introduced from other gates and communication apparatuses, numeral 18 a surface terminal, and numeral 19 a terminal frame for fixing the terminal strip 13.

The arrangement of FIG. 5 shows a case in which three frames or gates are included and it is needless to say that more than three gates may be included as far as the width and the height of the gates permit. The gate group 11 is so constructed as to be adapted for rotation by 90 degree counterclockwise about the supporting point 12 or a gate-supporting shaft (not shown) to the position shown by the two-point chains. Under normal conditions except for the maintenance and other repair work, they are positioned in such a manner that the back side of the innermost gate 11c is in contact with the inner wall surface of the container. The terminal strip provided in the frame of the communication apparatus is mounted adjacent to the supporting points 12, and there is space A provided between the terminal strip 13 and inner wall surface 15 of the container for allowing maintenance, wiring of the cable 14 and other work on the back terminal 16. The in-frame cable 14 for connecting the component elements (not shown) of the gate group 11 to the terminal strip 13 has, as already explained, a sufficient margin of length to allow the 90° rotation of the gates 11a to 11c, and is connected in advance with the back terminal 16 of the terminal strip 13 through the terminal frame 19 in the factory manufacturing processes. This is equal to say that the wiring work for connection of the in-frame cable 14 and terminal strip 13 is effected prior to the assembly of the gates 11a to 11c. The cable 17 from the other communication apparatuses is also connected to the surface terminal 18 through the terminal frame 19. This job is performed after completion of arrangement of the required number of communication apparatuses each comprising a group of three gates. By thus determining the wiring positions of the in-frame cable 14 and the ends of the cable 17 in advance, the wide space B for rotation of the gates is rendered available also for wiring work on the surface terminal 18.

Explanation will be made below of the hinge for connecting the gates 11a to 11c to the supporting points 12.

Figure 7:
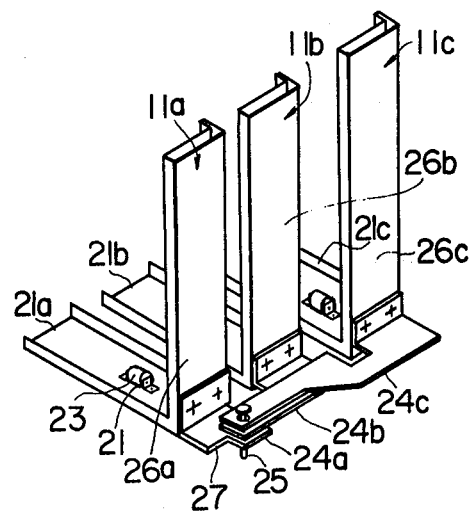
FIG. 7 is a diagram showing the construction of the rotatable hinge of the triple gate frame according to the present invention.

As shown in FIG. 7, the gates 11a to 11c are provided with base members 21a to 21c each of which has through-hole 22 in the vicinity of the ends thereof (only on end of each base member is shown in the drawing) to facilitate the rotation of the gates 11a to 11c. The wheel 23 mounted by means of a shaft on the brackets which are fixed on the upper surface of the base member is projected through the holes 22 downwardly of the base member thereby to effect the smooth movement of the gates.

Hinge members 24a to 24c for connecting the gates 11a to 11c with the gate rotating shaft 25 fixedly secured to the floor of the container are fixed at the ends of the side members 26a to 26c rising upright from the ends of the base members 21a to 21c.

The gate rotating shaft 25 is located substantially on the extension of the longitudinal center line of the the foremost gate 11a as shown in FIG. 5, and therefore the hinge member 24a consists of a substantially L-shaped metal material, while the hinge member 24b is provided with an arm portion compensating for the distance between the gate 11b and the gate rotation shaft 25. Also, the hinge member 24c has an arm portion as shown in the figure.

The hinge members 24a to 24c attached to the gates 11a to 11c are vertically displaced from each other to make small spaces therebetween so as to allow smooth rotation of the gates.

The hinge member 24a is provided with a notch at its corner which engages a stop pin secured on the floor thereby to limit the rotational angle of the gate to 90°. As a result, the remaining rotatable frames are prevented from rotation of more than 90°.

Figure 6:
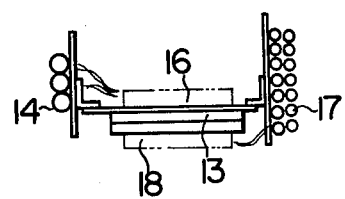
FIG. 6 shows a plan of the terminal frame according to the present invention.
Figure 8:
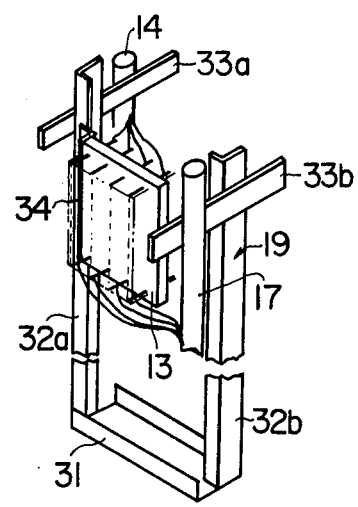
FIG. 8 is a diagram showing the construction of the terminal frame according to the present invention.

The terminal frame 19 comprises, as shown in FIGS. 6 and 8, the channel-shaped base member 31, a pair of vertical members 32a and 32b standing upright from the extreme ends of a diagonal line on the bottom of the base member 31, and a multiplicity pairs of horizontal members 33a and 33b in vertically predetermined spaced relationship at right angles to the vertical members 32a and 32b, although only the lowest pair of the horizontal members is shown in the drawing to facilitate the understanding. In view of the fact that the vertical members 32a and 32b are displaced from the center line of the base member 31, the horizontal members 33a and 33b are accordingly displaced from the same center line as they are fixed on the vertical members 32a and 32b.

The terminal frame 34 holding therein the terminal board 13 is interposed between the vertical member 32a and the horizontal member 33b at the vertical level where the horizontal members 33a and 33b are located.

It will be noted from the above explanation that according to the present invention a plurality of gates constituting a gate group are rotatable with the ends thereof following a common locus, there is space provided for maintenance work between the terminal strip and the inner wall of the container in the vicinity of the supporting point of the gates, and the terminal strip with an in-frame cable and an external cable wired on the back side and front side thereof is arranged substantially at right angles to the short sides of the gates, thereby resulting in the advantages of the ease with which the maintenance and wiring work is performed and the availability of closer arrangement of communication apparatuses in a limited space.

What we claim is:

1. A telephone exchange apparatus housed in a mobile container having longitudinally extending side walls comprising:

a plurality of groups of frames, each group of frames comprising plural movable frames with each frame having a front and a rear face, one half of said plurality of groups being disposed along one of the longitudinally extending side walls and the other half of said plurality of groups being disposed along the other one of the longitudinally extending side walls, respectively, the frames in each group being positioned in a normal state such that the rear face of a hindmost frame in each said group is closely confronted in parallel with one of said longitudinally extending side walls with substantially no clearance therebetween, that the front face of a foremost frame in each said group is accessible from a central maintenance path extending longitudinally and transversely in the center of said container, and that the front and rear faces of two mutually adjacent frames in each said group are confronted in parallel with each other with substantially no clearance therebetween;

hinge members connected to each of said frames for enabling the respective frames in each group to rotate about a common vertical axis positioned near to one lateral end of a frame in each said group for displacement from positions in the normal state to positions in a maintenance state and vice versa, outer ends of the respective frames of each group following a substantially common locus along the displacement path thereof, so that the one half of the plurality of groups of frames are positioned transversely apart from the other half of the plurality of groups of the frames with only the central maintenance path therebetween in the normal state, the groups disposed along both side walls of the container being commonly positionable in the maintenance state in said central maintenance path, said central maintenance path having only such a width extending transversely to the longitudinal side walls as substantially equal to a longitudinal length of one frame whereby nonutilizable space within said container is minimized and space utilization factor of the frames is improved, and a terminal frame respectively provided for each said group of frames in the vicinity of the common vertical axis positioned near to one lateral end of a frame in each said group, each of said terminal frames being fixedly secured to said container and having a terminal strip with front and back sides on which connection terminals are mounted, respectively, said terminal strip for each said group of frames being mounted to the respective terminal from so as to longitudinally extend in parallel with one side wall corresponding to said group with a small maintenance space between said one side wall and said terminal strip.

2. A telephone exchange apparatus according to claim 1, wherein the axis of each said group is positioned for enabling 90 degrees rotation of all the frames in said group within said central maintenance path.

3. A transportable telephone exchange apparatus according to claim 1, wherein each group of frames along the one of said side walls is disposed directly opposite to a respective group of frames along the other one of said side walls.

4. A transportable telephone exchange apparatus according to claim 3, wherein each end of each frame of each said group of frames follows a common locus along its displacement path.

5. A telephone exchange apparatus according to claim 1, further comprising shaft members forming said common vertical axes, each shaft member being secured on a bottom of the container at a position adjacent to the foremost frame in each said group, said hinge members being coupled to said shaft members for enabling the respective frames of each said group to rotate thereabout, respectively.

6. A telephone exchange apparatus according to claim 1, wherein a cable for in-frame use is wired on a back side of at least one of said terminal strips which faces the respective side wall of said container as well as on the rear face of the respective frames in each group and a cable from external equipment is wired on a front side of at least one of said terminal strips which faces said central maintenance path.

7. A telephone exchange apparatus according to claim 1, wherein said maintenance space between groups of frames is restricted in the longitudinal direction thereof by two adjacent groups of frames so as to minimize nonutilizable space.

* * * * *